United States Patent [19]

Okada et al.

[11] 3,828,266

[45] Aug. 6, 1974

[54] SIGNAL CONTROL CIRCUIT

[75] Inventors: Takashi Okada, Yamato; Yoshiaki Ogawara, Tokyo; Masashi Takeda, Isehara, all of Japan

[73] Assignee: Sony Corporation, Tokyo, Japan

[22] Filed: Feb. 28, 1973

[21] Appl. No.: 336,820

[30] Foreign Application Priority Data

| | | |
|---|---|---|
| Mar. 2, 1972 | Japan | 47-21878 |
| July 22, 1972 | Japan | 47-73587 |
| Aug. 14, 1972 | Japan | 47-81264 |

[52] U.S. Cl. .................. 330/29, 330/140

[51] Int. Cl. .................. H03g 3/30

[58] Field of Search .......... 330/29, 38 M, 130, 139, 330/140; 325/319

[56] References Cited

UNITED STATES PATENTS

| | | | |
|---|---|---|---|
| 2,554,469 | 5/1951 | Minener | 330/139 X |
| 3,416,092 | 12/1968 | Frederiksen | 330/38 M X |
| 3,512,096 | 5/1970 | Nagata et al. | 330/29 |
| 3,579,133 | 5/1971 | Harford | 330/29 X |
| 3,651,420 | 3/1972 | Giontzeneli et al. | 330/29 X |

*Primary Examiner*—Herman Karl Saalbach
*Assistant Examiner*—James B. Mullins
*Attorney, Agent, or Firm*—Lewis H. Eslinger, Esq.; Alvin Sinderbrand, Esq.

[57] ABSTRACT

A signal control circuit which includes an amplifying transistor connected to an input circuit to receive an input signal. A constant reference bias voltage is produced across a diode connected to the input circuit and signals are connected from the input circuit to the transistor by a resistor. A controllable impedance is connected at a point between the resistor and the transistor so that by controlling the impedance the current gain of the amplifier is linearly controlled over a wide range.

11 Claims, 8 Drawing Figures

SIGNAL CONTROL CIRCUIT

BACKGROUND OF THE INVENTION

1. Field of the Invention

This invention relates to a signal control circuit and particularly to a circuit adapted for incorporation in an integrated circuit (IC) device. More particularly, the invention relates to an automatic gain control (AGC) circuit which is linearly controllable over a wide range.

2. Description of the Prior Art

Conventional AGC circuits used in IC devices usually employ a differential amplifier in which two transistors are differentially connected to each other. The emitters of the two transistors are directly connected together and are connected through an input transistor to reference potential, such as ground. The input signal to be amplified is applied to the base electrode of the input transistor, and a control signal which may be used to control the gain of the amplifier is connected to the base electrode of one of the differentially connected transistors. An output terminal is connected to the collector circuit of the differentially connected transistors.

In this type of AGC circuit the current gain cannot be linearly controlled because the ratio of the input current to the output current cannot be maintained constant. This is due to a variation of the control signal. In addition, the range over which the gain can be controlled is held within narrow limits by reason of the operating voltage for the transistors. These defects are particularly objectionable in an IC device and accordingly, it is one object of the present invention to provide an improved signal control circuit that overcomes these disadvantages.

In particular, it is an object of this invention to provide an improved AGC circuit that is suited for incorporation in an IC device.

A further object of the invention is to provide an AGC circuit in which the AGC function is linear over a wide range in response to the control signal and the input signal.

A still further important object is to provide an AGC circuit in which the input and output direct voltages are held at a constant level regardless of variations of the control signal.

BRIEF DESCRIPTION OF THE INVENTION

The basic circuit of this invention includes a transistor amplifier in which the emitter is connected to ground and the collector is connected through a load impedance to a source of operating voltage. The base is connected through a resistor to an input circuit that includes terminals to receive the signal to be amplified and a constant bias voltage circuit comprising a diode, or diode-connected transistor, and another resistor in series with the diode and across the input terminals. The first mentioned resistor is connected to the junction between the diode and the second resistor. A circuit that is the equivalent of a variable current source is connected between ground and the junction of the first named resistor and the base of the amplifying transistor.

Current flowing in the variable current source is drawn through the first named resistor and thus varies the base-emitter input voltage to the amplifying transistor. This controls the gain of the transistor and, in fact, effects a linear relationship between the current that controls the variable current source and the gain of the amplifying transistor over a relatively wide range.

DETAILED DESCRIPTION OF THE INVENTION

Figure 1:
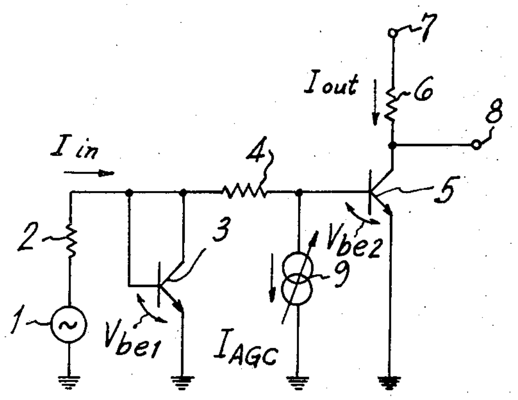
FIG. 1 is a schematic circuit diagram of a basic circuit according to the present invention.

In FIG. 1 an input signal source 1 is connected to the input circuit of the amplifier. One of the input terminals is connected to ground and the other is connected to a resistor 2 which in turn is connected to the base and collector electrodes of a transistor 3, the emitter of which is connected to ground. Thus, the transistor 3 is, in effect, a diode that produces a reference, or constant, bias voltage regardless of the input signals. The resistor 2 is selected to have a relatively large resistance whereby the source 1 and the resistor 2 comprise, in effect, a current source.

A resistor 4 connects the base and collector electrodes of the transistor 3 to the base electrode of a transistor 5 that constitutes the amplifying transistor of the circuit. The emitter of the transistor 5 is connected to ground and the collector is connected through a load resistor 6 to a terminal 7 to receive a direct operating voltage. An output terminal 8 is connected directly to the collector of the transistor 5.

An additional circuit element identified as a variable current source 9 is connected in series between the base of the amplifying transistor 5 and ground. While the source 1, the diode connected transistor 3, the transistor 5, and the source 9 are referred to as being connected to ground, it is to be understood that they may, alternatively, be connected to a reference voltage other than ground potential.

The circuit in FIG. 1 operates in such a way that the gain of the transistor 5 is controlled by varying the current of the source 9 to control the voltage drop across the resistor 4. This may be understood by assuming first that the control current from the source 9 is reduced substantially to zero. This is identified as the automatic gain control current $I_{AGC}$. In that case the input current $I_{in}$ that flows through the transistor $I_{out}$ flowing through the load impedance 6. This is because the base-emitter voltage $V_{be_1}$ of the diode-connected transistor 3 is substantially equal to the base-emitter voltage $V_{be_2}$ of the transistor 5.

As the current $I_{AGC}$ increases, it flows through the resistor 4 and causes a voltage drop thereacross. As a result, the base emitter voltage $V_{be_1}$ of the diode connected transistor 3 will be greater than the base emitter voltage $V_{be_2}$ of the transistor 5. This decreased voltage $V_{be_2}$ causes a decrease in the output signal current $I_{out}$, since the transconductance $g_m$ of the transistor 5 will be decreased. Since the voltage gain provided by the grounded-emitter transistor stage 5 is directly proportional to the transconductance $g_m$, the amplitude of signals developed at the collector of the transistor 5 will decrease. Neglecting the very small base currents of the transistors 3 and 5, the equation that defines the current $I_{in}$ flowing through the transistor 3 is given by the general expression:

$$I_{in} = (I_S + I_B)[\exp(Q/KT)V_{be_1} - 1] \approx (I_s + I_B) \exp (Q/KT)V_{be_1} \quad (1)$$

in which K is Bolzmann's constant, T is the absolute temperature in degrees Kelvin, Q is the charge on an electron, $I_S$ is the alternating current component of the input current, and $I_B$ is the direct current component of the input current. Similarly, the well known equation for the output current $I_{out}$ of a transistor connected as transistor 5 is:

$$I_{out} \approx (I_S + I_B) \exp (Q/KT)V_{be_2} \quad (2)$$

The relation between the input voltage $V_{be_1}$ of the diode-connected transistor 3 and the input voltage $V_{be2}$ of the transistor 5 is:

$$V_{be2} = V_{be_1} - RI_{AGC} = V_{be_1} - V_{AGC} \quad (3)$$

in which R is the absolute value of resistance of the resistor 4, $V_{AGC}$ is the voltage across the resistor 4 and $I_{AGC}$ is the AGC current flowing through the resistor 4.

Inserting the equation 3 into the equation 2, $I_{out}$ is defined as follows:

$$I_{out} = (I_S + I_B) \exp (Q/KT)(V_{be_1} - V_{AGC}) \quad (4)$$

The current gain $A_i$ is the ratio of the output current $I_{out}$ to the input current $I_{in}$ and is, therefore:

$$A_i = I_{out}/I_{in} = \exp (Q/-KT)V_{AGC}) \quad (5)$$

This means that the current gain $A_i$ can be controlled over a wide range by varying the AGC signal current, i.e., the voltage drop $V_{AGC}$ across the resistor 4.

Figure 2:
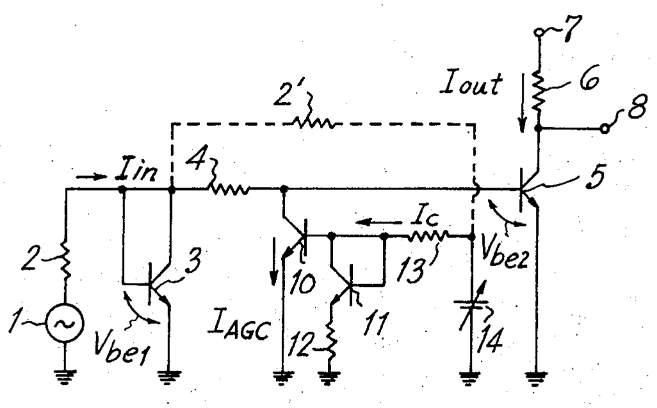
FIG. 2 is a more complete schematic diagram of the circuit in FIG. 1.

FIG. 2 shows the complete circuit equivalent to the circuit in FIG. 1 and including means for generating the equivalent of a variable current in place of the generator 9. The circuit components in FIG. 2 that are the equivalent of the current source 9 in FIG. 1 include a transistor 10, the emitter-collector circuit of which is connected across the base emitter input circuit of the amplifying transistor 5, a diode-emitter transistor 11, the base and collector of which are directly connected together to the base of the transistor 10, a resistor 12 which is connected in series with the diode-connector transistor 11 across the base emitter input terminals of the transistor 10, a resistor 13 and a control voltage source 14. The resistor 13 is connected between the control voltage source and the base of the transistor 10.

Figure 3:
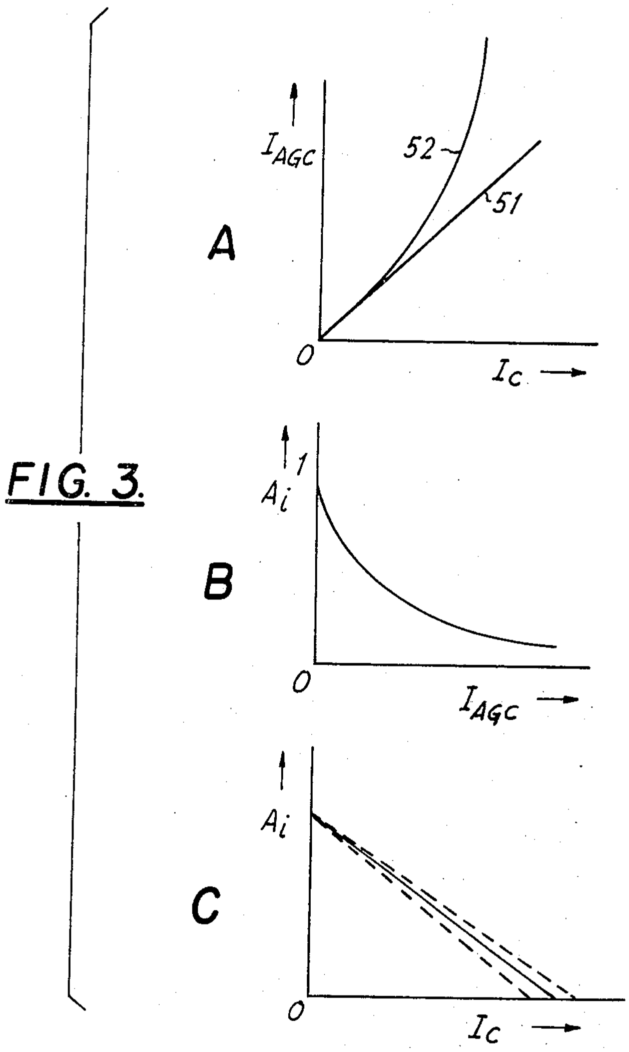
FIGS. 3A–3C show current and gain relationships in the circuits of FIGS. 1 and 2 in accordance with the present invention.

The operation of the circuit in FIG. 2 is as follows: assuming first that the resistor 12 is omitted, the collector current flowing through the transistor 10, which is the AGC current $I_{AGC}$, has substantially the same value as the control current $I_C$ of the constant current source that comprises the resistor 13 and the control voltage source 14. This is because the current amplification of the amplifier composed of the transistors 10 and 11 is substantially unity. Therefore, the characteristic of the control current $I_C$ versus the AGC signal current $I_{AGC}$ is almost linear as indicated by line 51 in FIG. 3A. However, when the resistor 12 is inserted in the emitter current path of the diode-connected transistor 11, the equation for the AGC signal current $I_{AGC}$ is as follows:

$$I_{AGC} = I_C \exp(Q/KT)\ R'I_C] \quad (6)$$

in which R' is the resistance value of the resistor 12. Thus, in practice, the characteristic of the control current $I_C$ versus the AGC signal current $I_{AGC}$ is a curved line 52 as shown in FIG. 3A.

On the other hand, as has been mentioned, the current gain $A_i$ controlled by the AGC signal current is given by equation 5. This is plotted in FIG. 3B which shows the AGC signal current versus the current gain $A_i$.

The current gain $A_i$ in the gain control circuit in FIg. 2 may also be defined by substituting Equation 6 in Equation 5 to obtain the following equation:

$$A_i = \exp [(Q/KT)\ R\ I_C \exp [(Q/KT)\ R'I_C] \quad (7)$$

This equation is plotted as a straight line in FIG. 3C. Accordingly, in the embodiment of the circuit shown in FIG. 2 the current gain $A_i$ is controlled linearly over a wide range by varying the control current $I_C$ or the control voltage source 14. Even if the parameters of the circuit are changed due to some reasons, the variation of the characteristic of the gain $A_i$ versus the current $I_C$ will be small as shown by the broken lines in FIG. 3C.

It should be noted that, since the diode-connected transistor 11 and the resistor 12 are connected in series across the base emitter input terminals of the transistor 10, the resistor 12 can be connected either in the emitter lead of the transistor 11 or in the emitter lead of the transistor 10.

In addition, in this embodiment, a DC bias current flows through the transistor 3 so as to produce a reference potential. Because of this current diode junction of the transistor 3 generates a noise signal which is commonly referred to as thermal noise and which will be amplified by the transistor 5. As a result, when the input signal has a low level the noise signal is quite noticeable. This is equivalent to saying that the signal has a reduced signal-to-noise ratio for low level input signals.

In order to overcome this objectionable feature, a resistor 2' is connected to the source 14 and the transistor 3 to supply the AGC current, which varies in response to the input signal level, as a DC bias current for the transistor 3. Thus, when the input signal has a low level, the AGC current flowing through the transistor 3 will be small, causing a lower level of noise to be generated. As a result, a substantially constant signal-to-noise ratio is maintained at the main transistor 5, regardless of the input signal level.

Figure 4:
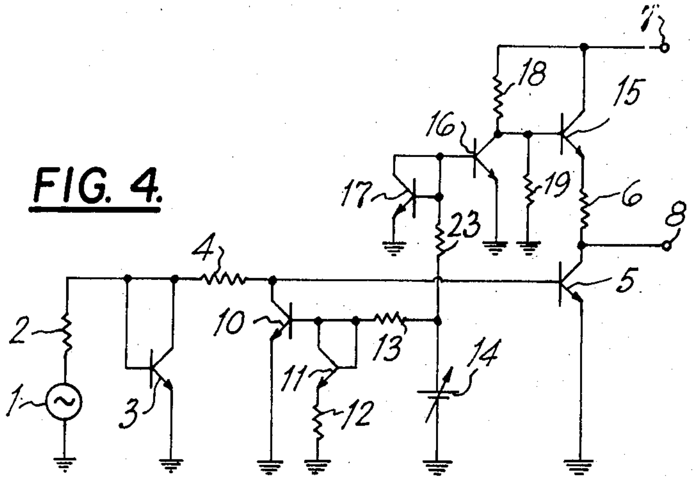
FIGS. 4–7 are schematic circuit diagrams illustrating improvements in the basic circuit in accordance with the present invention.

FIG. 4 shows a different embodiment in which the direct current level at the output terminal 8 is not affected by the control current. In this embodiment, the emitter-collector circuit of a transistor 15 is connected in series between the load resistor 6 and the power supply terminal 7. The collector of another transistor 16 is connected to the base of the transistor 15 and the emitter of the transistor 16 is connected to ground. The base of the transistor 16 is connected to a diode-connected transistor 17, the emitter of which is connected to ground, and, by way of a resistor 23, to the control voltage source 14. A pair of series-connected resistors 18 and 19 between the power supply terminal 7 and ground furnishes the load for the transistor 16 and determines the bias for the transistor 15.

In the operation of the circuit in FIG. 4, an increase in the control voltage causes the control current to increase and therefore causes the voltage drop across the resistor 4 to increase. This reduces the voltage at the base of the amplifying transistor 5 so that the voltage $V_{be2}$ is reduced and thereby causes a reduction in the output current $I_{out}$. This reduction in the output current reduces the voltage drop across the load resistor 6 and thereby causes the potential of the output terminal 8 to rise toward the level of the power supply voltage at the terminal 7.

However, the same increase in the control voltage of the source 14 causes the collector current of the transistor 16 to increase and thereby to increase the voltage drop across the load resistor 18. This reduces the level of the voltage at the base of the transistor 15 and makes that transistor less conductive so that the total voltage drop across the emitter-collector circuit of the transistor 15 and the load resistor 15 may be kept at a substantially constant value and the DC level at the output terminal 8 may be kept constant.

Conversely, when the control voltage of the source 14 decreases, the transistor 16 becomes less conductive and the voltage at its collector rises which makes the transistor 15 more conductive. At the same time, the effect of the decreasing gain control signal on the transistor 10 is to reduce the control current through the resistor 4 and increase the voltage level at the base of the transistor 5, thereby making the latter more conductive and tending to drop the voltage at the output terminal 8. This is counteracted by the increased conductivity of the emitter-collector circuit of the transistor 15 so that the DC level at the terminal 8 may be kept constant or may even go up. Thus, the gain control operation can be obtained without any effect on the level of the DC signal at the terminal 8. Therefore, these embodiments are preferably used for a DC coupled amplifier.

Figure 5:
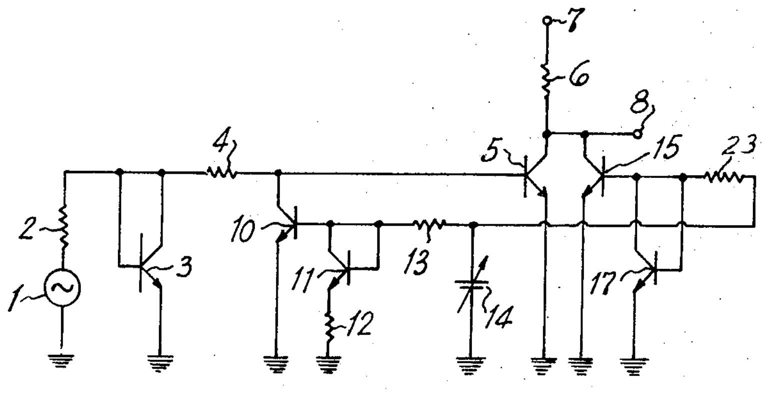

FIG. 5 shows still another embodiment of the circuit which is smaller to that in FIG. 4 except that the compensating circuit is in parallel with the amplifying transistor 5 rather than being in series with it. In FIG. 5 the emitter-collector circuit of the transistor 15 is directly in parallel with the emitter-collector circuit of the transistor 5 between the output terminal 8 and ground. The base of the transistor 15 is connected to ground by the diode-connected transistor 17, and it is not necessary to use an additional transistor such as transistor 16 in FIG. 4. The base of the transistor 15 is also connected to the control voltage source 16 by the resistor 23.

The operation of the circuit in FIG. 5 is such that an increase in the gain control signal of the source 14 causes the transistor 15 to become more conductive and to draw a larger current control current through the resistor 4 which produces a larger voltage drop across the resistor 4 and, therefore, a smaller $V_{be2}$ at the amplifying transistor 5. This reduces the output current $I_{out}$ of the transistor 5 and tends to raise the DC level of the output terminal 8.

At the same time the increased control voltage of the source 14 increases the conductivity of the transistor 15 so that more current is drawn through the load resistor 6 thus tending to keep the voltage drop across the load resistor constant and the level of the output terminal 8 constant.

Conversely, when the output signal of the source 14 drops, the conductivity of the transistor 10 also decreases and thus reduces the control current through the resistor 4. This increases the voltage $V_{be2}$ at the input circuit of the amplifying transistor 5 and increases the output current $I_{out}$ flowing through the load resistor 6. As a result, the DC voltage level of the output terminal 8 tends to drop.

At the same time, the decreased output signal from the source 14 decreases the conductivity of the transistor 15 and reduces the current drawn by that transistor through the load resistor 6. Since the voltage drop across the load resistor 6 is equal to the resistance times the sum of the current through it, the reduction of current drawn by the transistor 15 tends to balance the increased current through the transistor 5 and maintains the DC level of the output terminal 8 at a constant value. As in the balancing circuit shown in FIG. 4, if the compensating current is excessive, the DC level at the output terminal 8 can even go in the opposite direction from the direction that would be expected due to current through the amplifying transistor 5 alone.

Figure 6:
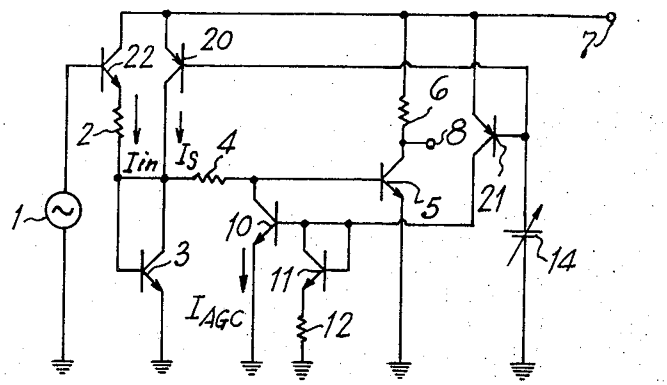

A further embodiment of the invention is shown in FIG. 6 in which the direct voltage at the collector of the transistor 3 is to be kept constant. In the circuit in FIG. 6 the emitter-collector circuit of a transistor 20 is connected between the power supply terminal 7 and the combined base and collector terminal of the diode-connected transistor 3. The base of the transistor 20 is connected directly to the base of another transistor 21, the emitter of which is connected to the power supply terminal 7, and the collector of which is connected to the base of the transistor 10. Both the transistors 20 and 21 are of the opposite conductivity type from the other transistors in the circuit. The bases of the transistors 20 and 21 are both connected to the control voltage source 14 to be actuated thereby. Still another transistor 22 has its base connected to the signal source 1 and its emitter-collector circuit connected in series with the resistor 2 and the power supply terminal 7.

In the operation of the circuit in FIG. 6 the current flowing in the transistor 3 is $(I_{in} - I_{AGC})$ and, therefore, in accordance with the change in the gain control signal, the voltage between the collector and emitter of the transistor 3 will be changed. To avoid such a change, the transistor 20 supplies a compensating current $I_S$ to the transistor 3 to keep the total current through the transistor 3 constant. That is, with an increase in the voltage of gain control signal source 14, the transistor 20 becomes less conductive and reduces the current $I_S$ supplied to the transistor 3. On the other hand, the current through the transistor 21 will also decrease in response to an increase in the level of the gain control signal from the source 14. It is easy to adjust the reduced current $I_S$ to correspond to the reduced control current. As a result, the direct voltage across the transistor 3 can be kept substantially constant without being affected by the control current.

Figure 7:
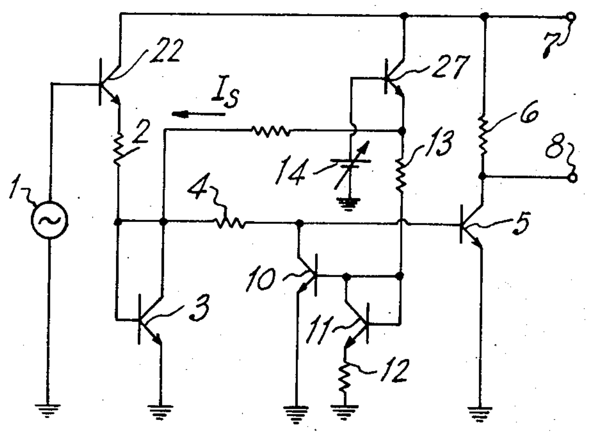

FIG. 7 shows a modification of the circuit in FIG. 6 in which a transistor 27 is so connected as to eliminate the need for the transistor 20. In FIG. 7 the transistor 27 is of the same conductivity type as the other transistors in this circuit and the resistor 13 connects the emitter of the transistor 27 to the base of the transistor 10. The emitter of the transistor 27 is also connected in series with the collector and base of the diode-connected transistor 3 to supply the compensating current $I_S$ thereto.

In the operation of the circuit in FIG. 7 an increase in the level of the source 14 increases the conductivity of the transistor 27 and thus increases the conductivity of the transistor 10 to draw more control current through the resistor 4 and to lower the voltage $V_{be2}$ at the input circuit of the amplifying transistor 5. At the same time the current through the emitter-collector circuit of the transistor 27 is also diverted in part to furnish the current $I_S$ to the diode-connected transistor 3. Hence, an increase in the conductivity of the transistor 27 in response to an increase of the gain control signal causes an increase in the compensating current $I_S$ and thereby maintains the voltage level across the diode-connected transistor 3 constant in spite of drawing more control current through the resistor 4.

As in the circuit in FIG. 6, the transistor 22 converts the input signal voltage source 1 into a current source to supply the input current $I_{in}$.

Figure 8:
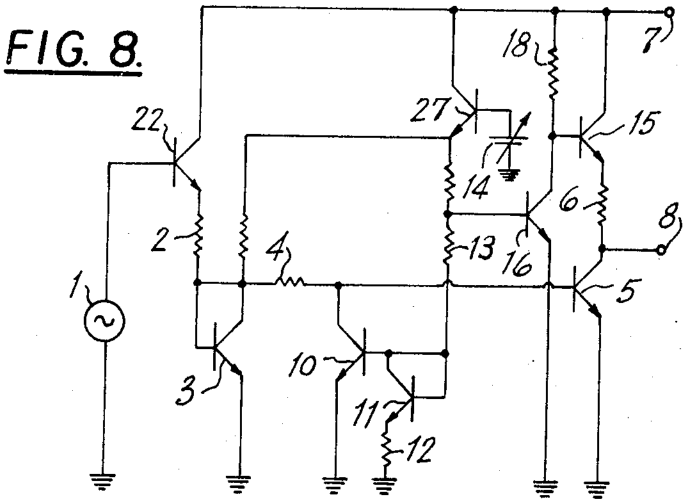

FIG. 8 shows still another embodiment of this invention in which the DC level of the output terminal 8 and the collector of the transistor 5 is kept constant regardless of the variation of the control current. This circuit is basically a combination of the circuits shown in FIGS. 4 and 7. As in the circuit in FIG. 4 the emitter-collector circuit of a transistor 15 is connected between the load resistor 6 and the power supply terminal 7. The transistor 16 is so connected that its emitter-collector circuit is in series between the base of the transistor 15 and ground and the load resistor 18 is connected between the collector of the transistor 16 and the power supply terminal 7. The base of the transistor 16 is connected to the center top of a voltage divider between the emitter of the transistor 27 and the base of the transistor 10, the lower part of that voltage divider comprising the resistor 13. The emitter-collector circuit of the transistor 26 is connected between the power supply terminal 7 and the upper end of the voltage divider and the emitter itself is also connected to the combined base and collector electrodes on the transistor 3 to supply the compensating current $I_S$ to the latter transistor. The control signal source 14 is connected to the base of the transistor 27.

The operation of the circuit in FIG. 8 is such that an increase in the output signal of the source 14 increases the conductivity of the transistor 26 and increases the compensating current $I_S$ supplied to the diode connected transistor 3. At the same time, the current through the voltage divider to the base of the transistor 16 is also increased which increases the conductivity of the transistor 16 and reduces the voltage at the collector thereof. This reduced voltage is also present at the base of the transistor 15 so that the latter becomes less conductive.

The increased current through the transistor 27 causes the transistor 10 to become more conductive and to increase the control current drawn through the resistor 4. As previously stated, this increased current does not affect the voltage level across the diode-connected transistor 3 but it does reduce the voltage $V_{be2}$ at the input circuit of the amplifying transistor 5, causing that transistor to draw less current. This reduction in the current through the transistor 5 would cause the DC level of the output terminal 8 to increase except for the fact that the reduction in conductivity of the transistor 15 compensates for the reduced conductivity of the transistor 5 and may either cause the level of the output terminal 8 to remain the same or even to decrease.

What is claimed is:

1. A signal control circuit comprising:

an amplifying transistor comprising input and output sections for amplifying an input signal reference voltage prouducing means including diode means for providing a constant biasing voltage for said amplifying transistor, said constant biasing voltage being independent of the input signal;

resistive means connected between said reference voltage producing means and said input section of said amplifying transistor; and control means responsive to a control signal and connected to a point between said resistive means and said input section to control the current through said resistive means, whereby the gain of said amplifying transistor will be controlled in accordance with said current.

2. The signal control circuit of claim 1 in which said reference voltage producing means comprises a transistor having its base and collector directly connected together.

3. The signal control circuit of claim 1 in which said control means comprises:

a second transistor having its emitter-collector circuit connected across said input section;

a source of control current;

rectifying means connected between said source of control current and the base of said second transistor; and a resistor connected in series with said rectifying means.

4. The signal control circuit of claim 3 in which said rectifying means and said resistor are connected in series across the base-emitter input circuit of said second transistor.

5. The signal control circuit of claim 3 comprising, in addition: separate means connecting said source of control current to said reference voltage producing means to supply to said reference voltage producing means a current that varies with the amplification of said amplifying transistor to maintain the sianal-to-noise ratio of said signal control circuit substantially constant for different levels of said control current.

6. The signal control circuit of claim 3 comprising, in addition:

a load impedance connected to said output section;

a third transistor having its emitter-collector circuit connected in series with said load impedance; and a fourth transistor having an input connected to said source of control current to be controlled thereby and having an output circuit connected to said third transistor to control the impedance of said third transistor inversely with the current through said load impedance, whereby the voltage at the collector of said amplifying transistor is substantially independent of variations in said control current.

7. The signal control circuit of claim 3 comprising, in addition:

a load impedance connected to said output section;

a third transistor having its emitter-collector circuit connected in series with said load impedance and in parallel with said output section of said amplifying transistor; and said source of control current comprising a source of control voltage and a resistor connected in series therewith, the base of said third transistor being connected to said source of control voltage to be controlled thereby, whereby a change in the magnitude of said control voltage will produce opposite changes in the current drawn through the load impedance by said amplifying transistor and said third transistor to maintain the DC level across said amplifying transistor and said third transistor substantially constant.

8. The signal control circuit of claim 3 comprising, in addition, a third transistor connected in series with said reference voltage producing means to control the current supplied thereto, said source of control current comprising a source of control voltage and impedance means connected thereto, said third transistor having a base connected to said source of control voltage.

9. The signal control circuit of claim 8 in which said impedance means connected to said source of control voltage comprises a transistor having a base connected to said source of control voltage and an emitter-collector circuit connected in series with the base of said second transistor.

10. The signal control circuit of claim 8 comprising, in addition, a compensating current carrying resistor connecting the emitter of said third transistor to said reference voltage producing means and an additional resistor connecting said emitter of said third transistor to the base of said second transistor to supply current thereto to control the current through the emitter-collector circuit of said second transistor.

11. The signal control circuit of claim 10 comprising, in addition:

a load impedance connected to said output section of said amplifying transistor;

a further resistor connected in series between said emitter of said third transistor and said additional resistor;

a fourth transistor having a base connected to the common connection of said further resistor and said additional resistor to be energized by the voltage at said common connection;

a load resistor connected in series with the collector of said fourth transistor; and a fifth transistor having a base connected to the collector of said fourth transistor to be controlled thereby and having an emitter-collector circuit connected in series with said load impedance to control the current through said load impedance to maintain the voltage across said output section of said amplifying transistor substantially constant.

* * * * *